(12) United States Patent
Amshoff et al.

(10) Patent No.: US 7,584,498 B2
(45) Date of Patent: Sep. 1, 2009

(54) METHOD AND APPARATUS FOR ENHANCED CABLE MODEM OPERATION

(75) Inventors: Mark Stephen Amshoff, Indianapolis, IN (US); Rodger Anthony Diemer, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1611 days.

(21) Appl. No.: 10/075,500

(22) Filed: Feb. 14, 2002

(65) Prior Publication Data

US 2002/0157110 A1  Oct. 24, 2002

Related U.S. Application Data

(60) Provisional application No. 60/285,844, filed on Apr. 23, 2001.

(51) Int. Cl.
    H04N 7/173   (2006.01)
(52) U.S. Cl. .................. 725/126; 725/111; 725/116; 370/207
(58) Field of Classification Search ........... 725/111; 709/227; 370/395.5, 207
    See application file for complete search history.

(56) References Cited

U.S. PATENT DOCUMENTS

| | | | | |
|---|---|---|---|---|
| 4,763,195 A | * | 8/1988 | Tults | 348/732 |
| 5,636,250 A | | 6/1997 | Scarpa | |
| 5,659,352 A | | 8/1997 | Lee | |
| 5,751,772 A | | 5/1998 | Mannette et al. | |
| 6,038,433 A | * | 3/2000 | Vegt | 455/161.1 |
| 6,088,386 A | | 7/2000 | Spruyt et al. | 375/222 |
| 6,091,932 A | | 7/2000 | Langlais | 455/5.1 |
| 6,151,335 A | | 11/2000 | Ko et al. | 370/487 |
| 6,170,008 B1 | | 1/2001 | Bahlmann et al. | 709/220 |
| 6,208,656 B1 | | 3/2001 | Hrastar et al. | 370/401 |
| 6,212,563 B1 | * | 4/2001 | Beser | 709/227 |
| 6,233,235 B1 | | 5/2001 | Burke et al. | 370/356 |
| 6,268,767 B1 | | 7/2001 | Maalej et al. | 329/304 |
| 6,286,058 B1 | | 9/2001 | Hrastar et al. | 710/8 |
| 6,301,223 B1 | | 10/2001 | Hrastar et al. | 370/227 |
| 6,324,267 B1 | | 11/2001 | Hraster et al. | 379/93.02 |
| 6,330,278 B1 | | 12/2001 | Masters et al. | 375/223 |
| 6,574,796 B1 | * | 6/2003 | Roeck et al. | 725/111 |

(Continued)

OTHER PUBLICATIONS

David Fellows and Doug Jones, "DOCSIS Cable Modem Technology", IEEE Communications Magazine, Mar. 2001, pp. 202-209, XP-001059346.

(Continued)

*Primary Examiner*—Seema S Rao
*Assistant Examiner*—Wanda Z Russell
(74) *Attorney, Agent, or Firm*—Robert D. Shedd; Paul P. Kiel; Guy H. Eriksen (57) ABSTRACT

A channel search algorithm is provided for application at a receiving end of a data transmission channel. In the operation of the data transmission channel, information is transmitted by modulation of an RF carrier and the modulation includes an encoding of information bits by symbols selected from a known symbol constellation, with one or more symbol constellations being established in accordance with a known standard. The channel search algorithm is operative to recognize and select a channel carrying an information signal modulated by a symbol constellation other than that established by the standard, and that selection of a channel using a non-standard symbol constellation is made in seamless coordination with the operation of a channel search, in accordance with the standard, for signals modulated by symbol constellations established by the standard.

19 Claims, 4 Drawing Sheets

U.S. PATENT DOCUMENTS

| | | | |
|---|---|---|---|
| 7,024,682 B2 * | 4/2006 | Lavaud et al. | 725/126 |
| 7,069,578 B1 * | 6/2006 | Prus et al. | 725/132 |
| 2002/0083465 A1 * | 6/2002 | Van Beek | 725/119 |
| 2002/0100057 A1 * | 7/2002 | Brown | 725/111 |
| 2002/0144286 A1 * | 10/2002 | Ovadia | 725/111 |

OTHER PUBLICATIONS

Mamdouh Droubi, Nasser Idirene, and Charles Chen, Dynamic bandwidth allocation for the HFC DOCSIS MAC protocol, 2000 IEEE, pp. 54-60, Holmdel, New Jersey.

* cited by examiner

METHOD AND APPARATUS FOR ENHANCED CABLE MODEM OPERATION

RELATED APPLICATION

This patent application claims the benefit of U.S. Provisional Application Ser. No. 60/285,844, filed on Apr. 23, 2001, entitled METHOD AND APPARATUS FOR ENHANCED CABLE MODEM OPERATION, the subject matter thereof being fully incorporated by reference herein.

FIELD OF THE INVENTION

The invention relates generally to broadband data transmission, and more particularly to modulation arrangements for data transmission in a broadband channel.

BACKGROUND OF THE INVENTION

As the popularity of the Internet has grown, and with it a vast increase in content available from the Internet, many users have found that access via the Public Switched Telephone Network (PSTN), with a maximum transfer rate of approximately 56 kbps, is unacceptably slow. Various higher-speed Internet access arrangements have been offered as an alternative to PSTN access, but one—broadband access provided via transmission plant operated by CATV carriers—has so far achieved significantly greater market penetration than the others. In a typical application for provisioning broadband data services over a cable network, one or more channels of the cable systems are allocated for downstream traffic to the data-access subscribers, while upstream traffic may be carried either in a channel established at a frequency other than those used by downstream transmissions, typically a channel established at a frequency below the frequency band used for television channels, or via a separate PSTN connection. A cable modem termination system (CMTS) provided at the cable system headend communicates through the data channel (or channels) with multiple cable modems located at subscriber premises on a shared-bandwidth basis.

In order to facilitate interoperability among cable modems manufactured by different vendors, a cable modem standard was adopted in 1997, called the Data Over Cable Service Interface Specification (DOCSIS). Among other things, the DOCSIS standard specifies modulation schemes and protocols for the exchange of bidirectional signals over cable. For the downstream transmission of data under the DOCSIS standard, the data information is modulated onto an RF carrier with a quadrature amplitude modulation (QAM) format. Specifically, the DOCSIS downstream data modulation is either 64 QAM or 256 QAM—the larger constellation 256 QAM providing a faster data rate, but also requiring a higher signal-to-noise ratio.

While the primary application of DOCSIS-compliant cable modems is the modulation and demodulation of broadband data transmitted via a cable system, the technology is equally applicable to data transmission via other transmission media having the requisite bandwidth. Among such other transmission systems are fixed wireless broadband systems, such as a Microwave Multi-point Distribution System (MMDS). However, such wireless broadband systems, as well as some cable systems could have reception issues that would not allow cable modems to operate properly when using the DOCSIS standard 256 QAM or 64 QAM modulation for the downstream channel. For example, wireless systems may be subject to variations in noise levels associated with a wireless environment. Also, certain cable systems may be subject to undesirably high noise conditions—e.g., systems that have not upgraded the trunk of the distribution system from coax to fiber, and systems where, in an effort to utilize all available bandwidth of existing equipment, channels have been added near the limits of the available bandwidth. Noise conditions in such wireless, wired, optical, coaxial, cable, and Hybrid Fiber-Coax (HFC) systems could cause a typical bi-directional communication device, such as a modem, to operate improperly or unreliably.

SUMMARY OF INVENTION

A channel search algorithm is provided for application at a receiving end of a data transmission channel, where information is transmitted via the data transmission channel by modulation of an RF carrier and the modulation includes an encoding of information bits by symbols selected from a known symbol constellation, with one or more symbol constellations being established in accordance with a known standard. The channel search algorithm is operative to recognize and select a channel using a symbol constellation other than that established by the standard, and that selection of a channel using a non-standard symbol constellation is made in seamless coordination with the operation of a channel search, in accordance with the standard, of channels using symbol constellations established by the standard.

In a particular embodiment of the invention, the data transmission channel is a downstream broadband point-to-point channel, the standard applied is DOCSIS and the established symbol constellations are 64 QAM and 256 QAM. The non-standard symbol constellation recognized and selected by the channel search algorithm of the invention is a lower ordered constellation of QAM, such as 16 QAM. In an implementation of the seamless coordination of the search algorithm of the invention with the channel search procedure established for a downstream channel operated in accordance with the DOCSIS standard, additional time needed for selection of a channel operating with a non-standard symbol constellation is minimized.

DETAILED DESCRIPTION OF THE INVENTION

The invention is directed to an improvement in usable data transmission via broadband transmission channels, and will be described hereafter in terms of a preferred embodiment—data transmitted via one or more video channels of a CATV system and received by a cable modem. In that preferred embodiment, the data is transmitted in accordance with the Data Over Cable Service Interface Specification (hereafter, "DOCSIS"), and the cable modem, which is operative to receive an RF signal modulated by the transmitted data, and to demodulate and decode the data into a form usable by a terminal, will be DOCSIS compliant. It should be understood, however, that the methodology of the invention is intended to be applicable to other broadband transmission media terminating in at a bi-directional communication device such as a modem, and operated pursuant to a standard set of necessary communications and operations support interface specifications, examples being the DOCSIS standard and the Euro-DOCSIS standard.

Figure 1:
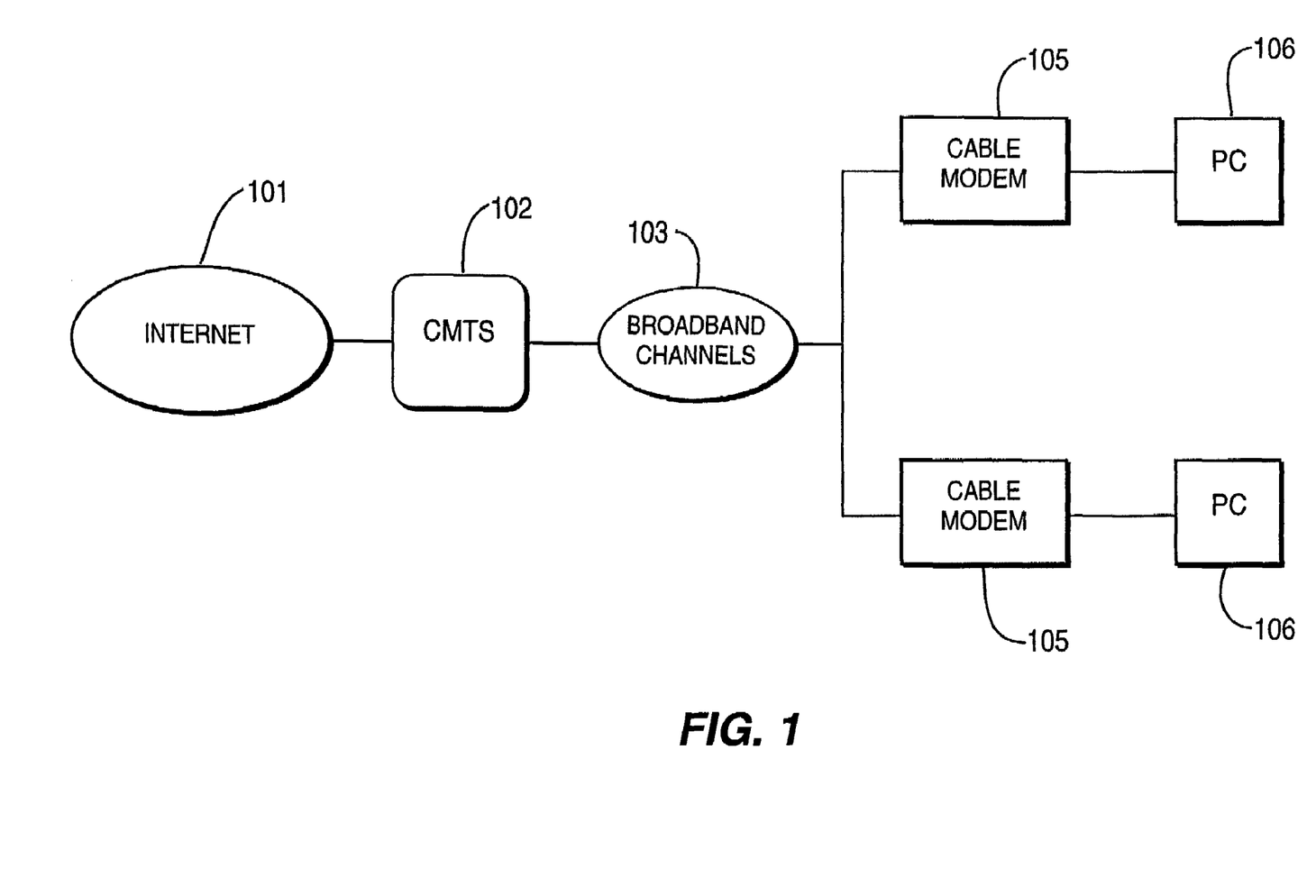
FIG. 1 is a schematic depiction of a broadband data transmission network.

FIG. 1 provides a schematic depiction of a network in which the methodology of the invention may be applied. As can be seen from the figure, at its bounds, the network of FIG. 1 provides a transmission path between a data network, such as Internet 101, and a user terminal, such as PC 106. The central portion of that transmission network, as represented by CMTS 102, Broadband Channels 103 and Cable Modem 105, is typically manifested as one or more RF video channels in a CATV system, modulated with the data transmitted between the Internet and a PC. The CMTS, or Cable Modem Termination System, operates at the head-end of the CATV system, providing an interface between the Internet and the RF transmission channels of the CATV system. In the downstream direction—i.e., data being sent from the Internet to a PC—the CMTS functions to modulate the CATV RF carrier with the transmitted data. Correspondingly, in the upstream direction, the CMTS operates to demodulate an RF carrier modulated with data being sent to the Internet, in order to recover the data. At the other end of the Broadband Channels link, the Cable Modem performs a complementary function, although, as will be well understood by those skilled in the art, the CMTS carries out additional functions than those of the Cable Modem, and generally operates in a master-slave relationship with the Cable Modem. The CATV plant, the physical layer over which Broadband Channels 102 are implemented, may be comprised of wired or wireless facilities, and is typically provided via a hybrid-fiber/coax (HFC) system.

In a typical North American CATV system, the CMTS transmits digitally-modulated RF signals downstream to the Cable Modems in a frequency range of 90 to 858 MHz, using channels having a 6 MHz bandwidth; relatedly, for typical European operation, the frequency range is 110 to 862 MHz and the channel bandwidth is 8 MHz. The data information is modulated by the CMTS onto the CATV carrier with a quadrature-amplitude modulation (QAM) format. The cable system operator is able to select either 64 QAM or 256 QAM, depending on channel conditions and a desired or required QoS. As will be apparent to those skilled in the art, the larger constellation 256 QAM provides faster data rates than 64 QAM.

For the usual implementation of broadband data transmission via a CATV system, the CMTS broadcasts simultaneously to all of the cable modems connected to its downstream path. When a cable modem is powered on, it must establish contact with the CMTS before it can gain network access. During an initialization process, the cable modem progresses through a series of steps needed to establish a registration with the CMTS for communication over the established data channel. In the course of that initialization process, the cable modem scans the downstream channels for a valid DOCSIS signal with 64 QAM or 256 QAM modulation—it being understood that the cable modem receives all of the RF channels of the CATV system and has no advance knowledge of the channel or channels being used for data transmission.

Figure 2:
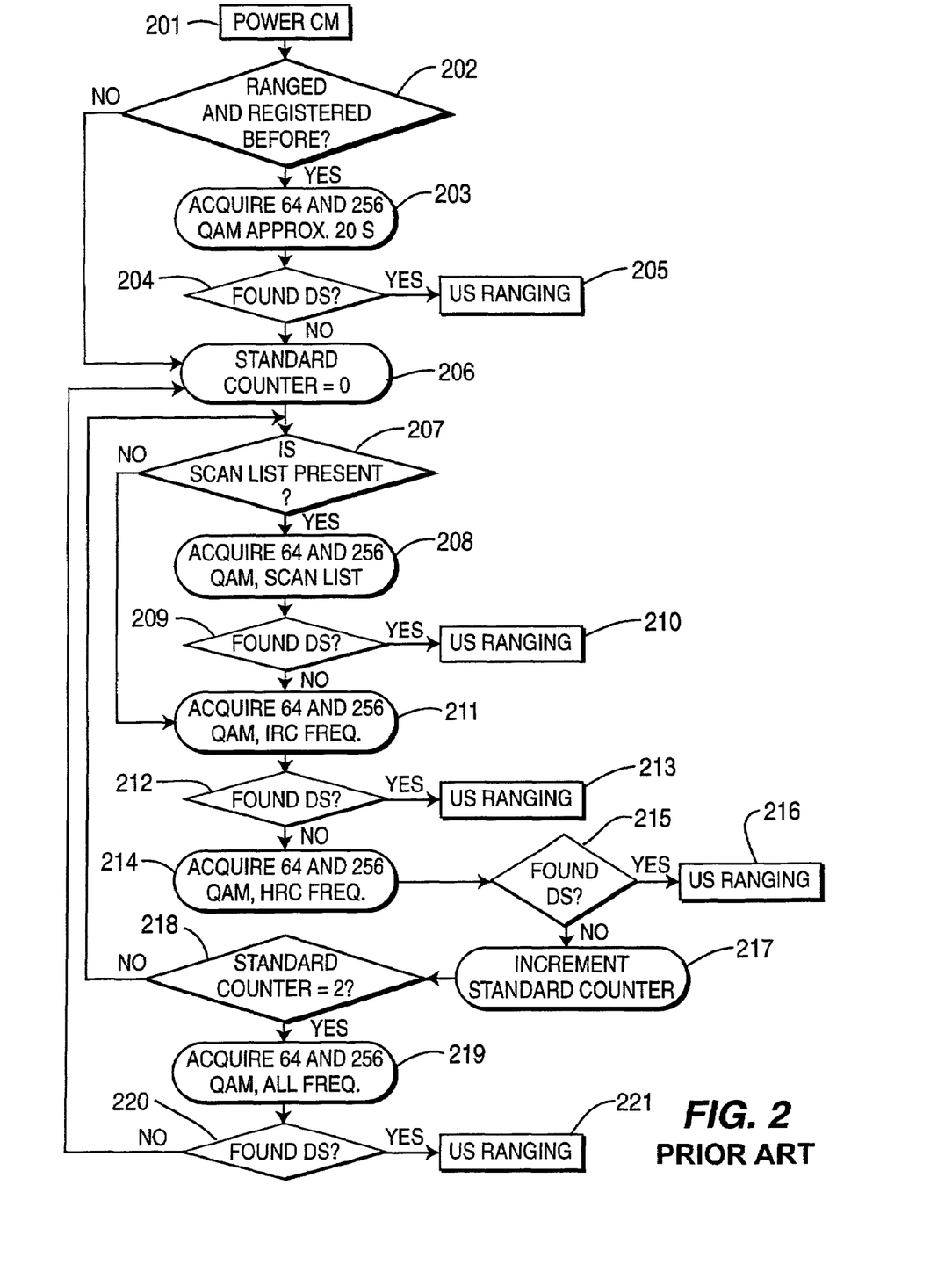
FIG. 2 is a flow diagram for the downstream channel search process carried out in the prior art.

A flow chart illustrating the channel search process carried out by the cable modem in a standard DOCSIS search is shown in FIG. 2. At modem power up (Step 201), the cable modem checks to determine if it has previously carried out ranging and registration with the CTMS at Step 202. The ranging and registration process for a DOCSIS-compliant system is well known in the art and will not be further explained here. Broadly, it is the handshake operation between the cable modem and the CTMS, via an upstream channel, once a DOCSIS downstream channel has been identified. If the ranging and registration process has previously occurred, the cable modem scans any set of frequencies previously known to be used for data channels—e.g., the last frequency tuned by the modem—for a downstream DOCSIS channel modulated at 64 QAM or 256 QAM, at Step 203. In normal operation, this scan is continued for approximate 20 seconds to assure that the cable modem is fully operational.

At Step 204, a test is made as to whether any downstream DOCSIS channel was located in the scan of Step 203. If such channel was found, the process proceeds to ranging/registration with the CMTS via the upstream channel (Step 205). If no downstream DOCSIS channel was found in the scan of Step 203, the channel-search process moves to Step 206, which is an iteration counter whose function will be explained more fully in conjunction with steps 207-218. In the event that a determination is made at step 202 that ranging/registration has not previously occurred, the channel-search process also goes to Step 206.

At the output of iteration counter Step 206, a test is made as to whether a Scan List is available at the modem. The Scan List is a short list of channels, typically 10 channels or so, that can be stored in the cable modem through SNMP (the management protocol for the link). These 10 channels may be, for example, preferred channels or channels which are most likely to provide the desired downstream communication path. If the Scan List is available, the channels in the list are scanned, at Step 208, for a DOCSIS signal modulated at 64 QAM or 256 QAM. If such a channel is found, the channel-search process proceeds to ranging/registration with the CMTS via the upstream channel (Step 210).

If no DOCSIS channel is found in the Scan List (at Step 209) or if no Scan List was found (at Step 207), the channel search process moves to Step 211, where a scan is made of all IRC (Incrementally Related Carriers) channels in the downstream frequency band for a DOCSIS signal modulated at 64 QAM or 256 QAM. A test is made at Step 212 to determine whether a DOCSIS signal was found in the channels scanned at Step 211. If such a channel was found, the channel-search process proceeds to ranging/registration with the CMTS via the upstream channel (Step 213).

If a DOCSIS channel was not found, the channel-search process moves to Step 214, where a scan is made of all HRC (Harmonically Related Carriers) channels in the downstream frequency band for a DOCSIS signal modulated at 64 QAM or 256 QAM. A test is made at Step 215 to determine whether a DOCSIS signal was found in the channels scanned at Step 214. If such a channel was found, the channel-search process proceeds to ranging/registration with the CMTS via the upstream channel (Step 216).

If, however, a DOCSIS channel was not found in the scan at Step 214, the channel search process returns to the step 207 for a further iteration of steps 207-215, for a total of 2 such iterations. To that end, the Standard Counter is incremented by one, at Step 217, and then a test is made at Step 218, as to whether the Standard Counter reading is equal to 2 (the initial loop through steps 207-215 and the first iteration being indicated by counter readings of "0" and "1," respectively). If not, as previously indicated, the channel-search process returns to Step 207.

If the Standard Counter reading is 2, indicating that both iterations of steps 207-215 have been completed, the channel-search process advances to Step 219, where all frequencies in the downstream frequency band are scanned for a DOCSIS signal modulated at 64 QAM or 256 QAM. A test is made at Step 220 to determine whether a DOCSIS channel was found among the frequencies scanned at Step 219. If such a channel was found, the channel-search process proceeds to ranging/registration with the CMTS via the upstream channel (Step 221). If no DOCSIS channel was found, the process returns to Step 206 with the Standard Counter set to 0.

An algorithm form description of the channel-search process heretofore described in conjunction with FIG. 1, by which a cable modem searches for an acceptable channel by testing the various available channels, is a sequence such as the following:

1. 64 QAM and 256 QAM in a 10 channel scan list
2. 64 QAM and 256 QAM for 134 IRC channels
3. 64 QAM and 256 QAM for 134 HRC channels
4. Repeat steps 1 through 3 two times
5. 64 QAM and 256 QAM on all DOCSIS frequencies
6. Go back to step 1

As heretofore described in the Background section, with certain types of cable and wireless systems, information recovery at the cable modem becomes problematic at the DOCSIS-standard 256 QAM or 64 QAM modulation. For such systems, the use of modulation techniques other than 64 QAM (i.e., smaller symbol constellations) could improve cable modem operation by increasing the likelihood that reliable cable modem operation could occur. It is known that reducing the constellation density associated with digital modulation is an approach to improving performance with system impairments and lower signal-to-noise ratios. For example, 16 QAM modulation would allow downstream communication to occur with a 6 dB worse signal to noise ratio compared to the DOCSIS standard 64 QAM modulation (albeit at a slower information rate). Such an approach would also improve performance due to other impairments, such as multipath.

However, adding the capability to the modem for performing a 16 QAM search (or another lower-constellation modulation format) along with DOCSIS standard 64 QAM and 256 QAM could increase initial downstream channel search times by 50%. Such a 50% increase in search time would cause a delay in operation that would be noticeable and objectionable to a user. In particular, the delay might be sufficient to cause a user to believe that the cable modem is inoperative or, at least, unable to connect properly.

With the method and apparatus of the invention, reliable and correct downstream operation of a cable modem under adverse conditions such as those described above is provided, without impacting the operation under normal circumstances and with minimal search time increases under adverse conditions. The approach of the invention is described hereafter.

Advantageously, and in accordance with the principles of the present invention, we have recognized and conceived that the DOCSIS-standard operation described in conjunction with FIG. 2 may be modified to add a modulation technique other then the DOCSIS standard modulation without significantly impacting the standard DOCSIS search time. For example, using the algorithm-form description of the search process provided above, a modification of the DOCSIS-standard search, according to the invention, to include acquisition of a signal modulated at 16 QAM is shown below:

1. 64 QAM, 256 QAM and 16 QAM in the 10 channel scan list
2. 64 QAM and 256 QAM for 134 IRC channels
3. 64 QAM and 256 QAM for 134 HRC channels
4. Repeat steps 1 through 3 two times
5. 16 QAM for 134 IRC channels
6. 64 QAM and 256 QAM on all DOCSIS frequencies
7. Go back to step 1

As can be seen, with the search algorithm of the invention, the 16 QAM scan will be made in the 10 channel Scan List (if it exists) following the scan of the channels in that list for a DOCSIS signal modulated at 64 QAM or 256 QAM. Otherwise, channel acquisition at 16 QAM will only be attempted after all standard 64 and 256 QAM channel searches have been attempted.

Figure 3:
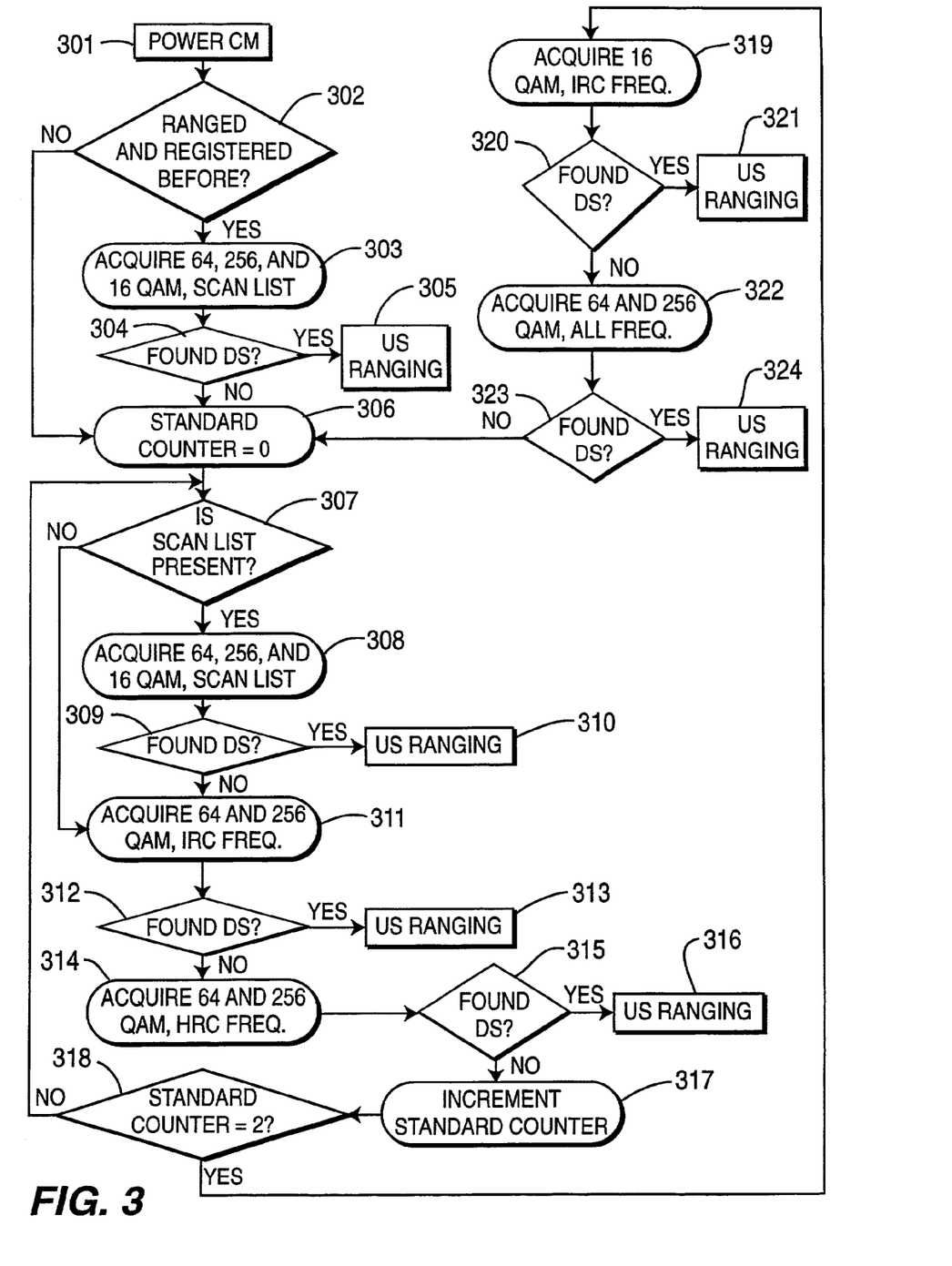
FIG. 3 is a flow diagram for the downstream channel search process carried out by a first embodiment of the invention.

This embodiment of the channel-search methodology of the invention is depicted in flowchart form in FIG. 3. With reference to that figure, it can be seen that Steps 301-318 correspond substantially to Steps 201-218 of FIG. 2. The difference in this portion of the search process for the embodiment of FIG. 3 occurs at steps 303 and 308. At step 303, a search for a signal modulated at 16 QAM is carried out for the channels in any set of frequencies previously known to be used for data channels following the scan of those channels for a DOCSIS signal modulated at 64 QAM or 256 QAM. Similarly, at step 308, a search for a signal modulated at 16 QAM is carried out for the channels in the Scan List following the scan of those channels for a DOCSIS signal modulated at 64 QAM or 256 QAM.

At the conclusion of step 318, however, assuming that a DOCSIS signal has not been found in the two iterations of the loop comprising steps 307-315, the channel-search process of the invention moves to Step 319, where a scan of the IRC channels is made for a signal modulated at 16 QAM. At Step 320, a test is made to determine whether a channel having such a signal was found. If such a signal is found, the channel-search process proceeds to ranging/registration with the CMTS via the upstream channel (Step 321). If no channel is found in the scan of Step 319, the channel-search process moves to step 322 where a scan is made of all frequencies in the downstream frequency band for a DOCSIS signal modulated at 64 QAM or 256 QAM (corresponding to step 219 of FIG. 2). If a DOCSIS channel is found in Step 322, the channel-search process proceeds to ranging/registration with the CMTS, and if not, the process returns to Step 306, with Standard Counter set to 0.

The modified search algorithm of the invention would allow the user under most circumstances to realize a similar initial downstream search time with or without the 16 QAM acquisition. More specifically, it is expected that the described method would add at most 7 seconds to the search before getting to the 64 and 256 QAM acquisitions in Step 322. Moreover, in most cases, the method would not increase the time at all since most channels used are IRC or HRC. Thus, by providing a cable modem operative to carry out the downstream search algorithm of the invention, operators of fixed wireless systems or cable systems could use a non-DOCSIS standard modulation technique such as 16 QAM on the downstream channel with a DOCSIS compliant cable modem. Therefore, system operators will be able to ensure reliable cable modem operation under a wider range of conditions.

Other embodiments of the modified channel search algorithm are also within the contemplation of the invention. For example, modulation techniques other than 16 QAM may be used in addition to or instead of 16 QAM. In a particular alternative embodiment, the search algorithm may also scan for QPSK modulated signals. An algorithm form for the search process of this embodiment is shown below:

1. 64 QAM, 256 QAM, 16 QAM and QPSK in the 10 channel scan list
2. 64 QAM and 256 QAM for 134 IRC channels
3. 64 QAM and 256 QAM for 134 HRC channels
4. Repeat steps 1 through 3 two times
5. 16 QAM and QPSK for 134 IRC channels 6. 64 QAM and 256 QAM on all DOCSIS frequencies 7. Go back to step 1

Figure 4:
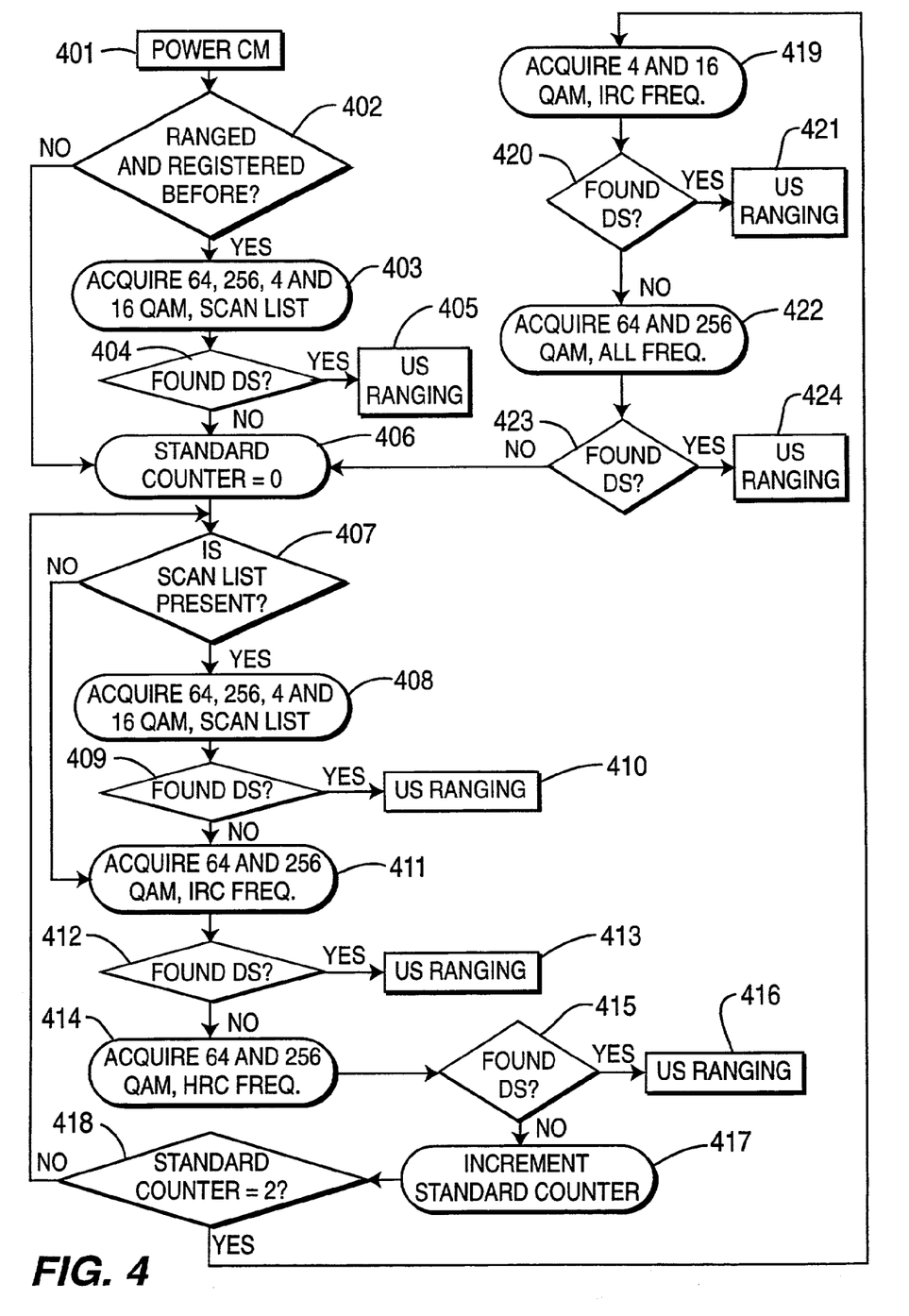
FIG. 4 is a flow diagram for the downstream channel search process carried out by a second embodiment of the invention.

A flowchart for this alternative embodiment is shown in FIG. 4. With reference to that figure, it can be seen that the channel-search process is similar to that of the embodiment of FIG. 3, except for steps 403, 408 and 419. In step 403, a further search for signals modulated at 4 QAM (corresponding to QPSK) is carried out in any set of frequencies previously known to be used for data channels following the scan of those channels for 64 QAM, 256 QAM and 16 QAM. In like manner, at step 408, a further search for signals modulated at 4 QAM is carried out in the Scan List following the scan of those channels for 64 QAM, 256 QAM and 16 QAM. Then, after all iterations of steps 407-416 are completed, a scan is made at step 419 for a signal modulated at 4 QAM and at 16 QAM in the IRC channels.

Numerous modifications and alternative embodiments of the invention will be apparent to those skilled in the art in view of the foregoing description. In particular, the application of the methodology of the invention to other or additional modulation arrangements is intended to be within the contemplation of the invention. It is also contemplated that the methodology of the invention will be applied in systems operating under the Euro-DOCSIS standard.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed is:

1. In a DOCSIS transmission system comprising a plurality of transmission channels wherein at least one of said plurality of channels carries a data signal thereover, a channel search method for finding a data channel available for use by a terminal located at a downstream end of said plurality of transmission channels, said method comprising the steps of:

sequentially scanning at least two selected subsets of said plurality of data channels for a channel having a data signal transmitted at a predetermined modulation protocol; and if the data channel scanned for in the preceding step is not found, further sequentially scanning at least one, but less than all, of the selected subsets of the plurality of channels for a channel having a data signal transmitted at other than said predetermined modulation protocol.

2. The channel search method of claim 1, including the further step of: sequentially scanning all of said plurality of channels for a channel having a data signal transmitted at said predetermined modulation protocol.

3. The channel search method of claim 1, wherein the first sequential scanning step is repeated at least once prior to beginning the step of scanning at least one of the selected subsets.

4. The channel search method of claim 1, wherein the predetermined modulation protocol is either 64 QAM or 256 QAM, and wherein the modulation protocol other than said predetermined modulation protocol is 16 QAM.

5. The channel search method of claim 1, wherein the predetermined modulation protocol is either 64 QAM or 256 QAM, and wherein the modulation protocol other than said predetermined modulation protocol is 4 QAM.

6. The channel search method of claim 1, wherein data transmitted via said data channel available for use by said terminal is in accordance with the DOCSJS standard.

7. The channel search method of claim 1, wherein data transmitted via said data channel available for use by said terminal is in accordance with the Euro-DOCSJS standard.

8. A bi-directional DOCIS complaint communication device, operative to receive a data signal transmitted over at least one transmission channel selected from a plurality of transmission channels, comprising:

receiving and channel-search means operative to sequentially scan at least two selected subsets of said plurality of transmission channels for a channel having a data signal transmitted at a predetermined modulation protocol; and the receiving and channel-search means being further operative, upon not finding the data channel during the sequential scan, to scan at least one, but less than all, of the selected subsets of the plurality of data channels for a channel having a data signal transmitted at other than said predetermined modulation protocol.

9. The bi-directional communication device of claim 8, wherein the receiving and channel-search means is still further operative to scan all of the plurality of channels for a channel having a data signal transmitted at said predetermined modulation protocol.

10. The bi-directional communication device of claim 8, wherein the receiving and channel-search means further operates to repeat the first sequential scan at least once prior to beginning the scan of the at least one of the selected subsets.

11. The bi-directional communication device of claim 8, wherein the predetermined modulation protocol is either 64 QAM or 256 QAM, and wherein the modulation protocol other than the predetermined modulation protocol is 16 QAM.

12. The bi-directional communication device of claim 8, wherein the predetermined modulation protocol is either 64 QAM or 256 QAM, and wherein the modulation protocol other than the predetermined modulation protocol is 4 QAM.

13. The bi-directional communication device of claim 8, wherein data transmitted via said at least one transmission channel is in accordance with the DOCSIS standard.

14. The bi-directional communication device of claim 8, wherein data transmitted via said at least one transmission channel is in accordance with the Euro-DOCSIS standard.

15. The bi-directional communication device of claim 8, wherein the bi-directional communication device is a modem.

16. The bi-directional communication device of claim 15, wherein the modem is a cable modem.

17. In a DOCSIS transmission system comprising a plurality of channels, wherein information is transmitted via one or more data transmission channels among the plurality of channels by a modulation arrangement in which information bits are encoded by symbols selected from a known symbol constellation, and further wherein the symbol constellation used for encoding the information bits is selected from a set of symbol constellations established in accordance with a known standard, a channel search method for application at a receiving end of the data transmission channel comprising the steps of:

sequentially scanning at least two selected subsets of said plurality of channels for a channel having a data signal modulated thereon in accordance with symbols from one of said symbol constellations established in accordance with said known standard (the "data channel");

upon not finding the data channel in the sequential scanning step, scanning at least one, but less than all, of the selected subsets of the plurality of channels for a channel having a data signal modulated thereon in accordance with symbols from a symbol constellation other than one of said symbol constellations established in accordance with said known standard (the "non-standard data channel"); and upon not finding the data channel in the sequential scanning step or the non-standard data channel in the step of scanning at least one of the selected subsets, scanning all of said plurality of data channels for a channel having a data signal modulated thereon in accordance with symbols from one of said symbol constellations established in accordance with said known standard.

18. The channel-search method of claim 17, wherein the symbol constellations established in accordance with the known standard comprise 64 QAM and 256 QAM, and wherein the symbol constellation other than the standard-compliant format is 16 QAM.

19. The channel-search method of claim 18, wherein the symbol constellations established in accordance with the known standard comprise 64 QAM and 256 QAM, and wherein the symbol constellation other than the standard-compliant format is 4 QAM.

* * * * *

UNITED STATES PATENT AND TRADEMARK OFFICE
CERTIFICATE OF CORRECTION

| | |
|---|---|
| PATENT NO. | : 7,584,498 B2 |
| APPLICATION NO. | : 10/075500 |
| DATED | : September 1, 2009 |
| INVENTOR(S) | : Amshoff et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2283 days.

Signed and Sealed this

Fourteenth Day of September, 2010

David J. Kappos
*Director of the United States Patent and Trademark Office*